Patented June 20, 1939

2,163,104

UNITED STATES PATENT OFFICE 2,163,104

CHEMICAL COMPOUND

Paul L. Salzberg, Wilmington, Del., assignor to E. I. du Pont de Nemours & Company, Wilmington, Del., a corporation of Delaware No Drawing. Application December 17, 1936.
Serial No. 116,435

18 Claims. (Cl. 21—5)

This invention relates to new chemical substances having mothproofing properties, and to compositions containing them. It relates more particularly to the normal and acid salts of fluosilicic acid with certain polymeric amino-nitrogen-containing substances, and to insecticidal compositions containing them.

The fluosilicates of many monomeric organic bases, including amines, have been prepared heretofore and used as mothproofing agents. They are quite effective as such but lack permanency against repeated laundering and dry cleaning.

This invention has as an object the preparation of permanent mothproofing compounds. A further object is the preparation of fluosilicates of amino-nitrogen-containing polymers. A further object is the preparation salts of amino-nitrogen-containing polymers with acids having a fluorine containing anion, particularly an anion which also contains a positive element. A further object is the preparation of organic fluosilicates which can be insolubilized in or on materials which are to be protected from the ravages of insects, particularly moths. A further object is a method for treating fabrics and other materials which renders them resistant to the action of moths and similar insects even after laundering and dry cleaning. Other objects will become apparent as the description proceeds.

The above and other objects appearing hereinafter are accomplished by the following invention which comprises reacting an aqueous solution of an acid containing a fluoro anion usually a binary fluoroanion and preferably aqueous fluosilicic acid, in the manner and proportion more fully set forth below, with amino-nitrogen-containing substances having definite and selected properties, also given more fully below, and applying the resulting fluorocompound or fluosilicate or solution thereof to a fabric or other material subject to the attack of insects. Alternatively the fluoro salt fluosilicate may be formed in situ on the fabric or other material to be protected. In the discussion below the fluosilicates are used for convenience of discussion.

In order that the outstanding permanency of the mothproofing treatment be realized, there must be used in making the fluosilicate an amino-nitrogen-containing polymer which is insoluble in water and 5 per cent aqueous ammonia, soluble in at least the stoichiometrical amount of 2 per cent aqueous acetic acid, and capable of being formed into a coherent film. It is a matter of simple test to determine whether a given amino polymer has these properties. I have prepared the fluosilicates of numerous such polymers, and all of them without exception have positive mothproofing effects that are more or less permanent. Further, I believe that only with such amino polymers can fluosilicates capable of insolubilization on the fabric be obtained.

Typical amino-nitrogen-containing polymers having the above-noted properties are substantially undegraded partially deacetylated chitin, dimethylaminomethylzein, and phenol-formaldehyde-methylamine resin. These and other typical amino polymers that may be used, and their source, are given following the examples.

In preparing the fluosilicates, I prefer to react fluosilicic acid with the amino-nitrogen-containing polymer simply by adding the aqueous acid to a mixture of the polymer with water and then stirring vigorously until solution is effected. If the normal salt is desired I employ one-half mol of acid per mol of amino polymer; if the acid salt is to be made, I use one mol of acid per mol of polymer. The anhydrous fluosilicate may then be obtained if desired by evaporation of the water or by precipitation in a water-soluble organic liquid. One mol of amino polymer is considered to be that amount which is exactly neutralized by one equivalent weight of acetic acid in a 2 per cent aqueous solution. It may be determined by nitrogen analysis where all the nitrogen of the polymer is amino nitrogen (as with phenol-formaldehyde-methylamine resin) or by titration where it is not (as with piperidylmethylzein).

The preferred method of applying the fluosilicate to the substance which is to be mothproofed is to soak the latter material in an aqueous solution containing 0.06 per cent to 2.0 per cent by weight of the fluosilicate at a temperature of about 75–85° C. for about 4 minutes, after which the excess solution is removed as by wringing or centrifuging. The fabric, for example, is then ironed perfectly dry or otherwise heat-treated in suitable fashion to effect further polymerization of the fluosilicate or otherwise insolubilize it on the fiber. Materials thus treated are resistant to the attack of textile pests even after several washings with soap and water or dry cleaning solvents.

The following examples, in which parts given are by weight unless otherwise indicated, illustrate the more detailed practice of the invention. It will be understood of course that the invention is not limited to these examples. The amino polymers prepared or used in these examples are all insoluble in water and in 5 per cent aqueous ammonia, are soluble in the stoichiometrical amount or more of 2 per cent aqueous acetic acid, and are capable of being formed into coherent films.

EXAMPLE I

Fluosilicate of deacetylated chitin

To 100 parts of a 3 per cent aqueous solution of the lactate of deacetylated chitin was added slowly and with good stirring a 10 per cent aqueous solution of fluosilicic acid until no further precipitation occurred. The mixture was then poured into methanol, filtered, washed with methanol and dried. There was obtained about three parts of the fluosilicate of deacetylated chitin, a nearly white powder substantially insoluble in cold water but soluble to a considerable extent at a temperature above 80° C. By analysis this salt contained 22.55 per cent of fluorine. An aqueous solution of the salt upon evaporation at 100° C. yielded a coherent somewhat brittle film which after heating at 100° C. for one-half hour could not be redissolved in boiling water.

The deacetylated chitin lactate used in this preparation was made by stirring 25 parts of medium viscosity deacetylated chitin flakes (produced according to Rigby U. S. 2,040,879) with 400 parts of a 10 per cent solution of lactic acid in methanol for several hours. The lactate was then filtered off, washed with ether, and dried. This product was readily soluble in water.

EXAMPLE II

Fluosilicate of piperidylmethylzein

To a suspension of 15.8 parts of piperidylmethylzein in 50 parts of water was added 14 parts of 30 per cent aqueous fluosilicic acid with good stirring. When the piperidylmethylzein had completely dissolved, the solution was poured very slowly and with good stirring into 400 parts of acetone. The gummy precipitate thus formed was gathered up into a ball and transferred to another 400 parts of acetone in which, after considerable stirring and kneading, it solidified to a brittle resin that was ground in a mortar under acetone to a powder, filtered off, washed with acetone and dried. There was obtained 19 parts of the fluosilicate of piperidylmethylzein, a slightly greenish powder that was completely soluble in water and contained by analysis 11.07 per cent fluorine.

The piperidylmethylzein was prepared by the method disclosed in Meigs copending application Ser. No. 59,643, filed January 17, 1936.

EXAMPLE III

Fluosilicate of methylamine-phenol-formaldehyde resin

Fifty-five and six-tenths parts of 30 per cent aqueous fluosilicic acid was added to 17.36 parts of methyl-amine-phenol-formaldehyde resin in 50 parts of water, and the mixture stirred until the resin had completely dissolved. The solution thus produced was poured very slowly into a large amount of methanol, with vigorous stirring. The fluosilicate of the amino resin precipitated out at first as a soft solid, which, however, soon became hard and brittle. It was then ground to a powder, washed with acetone, and dried. There was obtained 26 parts of a white powder completely soluble in water and containing by analysis 22.86 per cent fluorine.

The methylamine-phenol-formaldehyde resin employed in the above experiment was prepared according to the process disclosed in Harmon and Meigs copending application, Ser. No. 85,820, filed June 17, 1936.

EXAMPLE IV

Process for mothproofing with deacetylated chitin fluosilicate

A. A 25-gram sample of eiderdown blanket stock was soaked in 500 cc. of 0.5 per cent aqueous deacetylated chitin lactate solution at 50° C. for 15 minutes. After wringing out the excess solution, the weight of the sample had increased by 25 grams. The eiderdown was then soaked in 500 cc. of an 0.5 per cent aqueous fluosilicic acid solution at 25° C. for 15 minutes, after which it was wrung out and dried. It was heat-treated by pressing for 10 minutes with a hot iron. By this process the fluosilicate salt of the amine polymer was formed in situ on the fiber and subsequently insolubilized. The treated material was subjected to moth tests, the results of which are given in Table I.

B. To a solution of 2.5 grams of deacetylated chitin lactate in 500 cc. of water there was added gradually and with rapid stirring a solution containing 2.32 grams of fluosilicic acid in 100 cc. of water. The deacetylated chitin fluosilicate appeared as a gelatinous precipitate, which dissolved on heating above 75° C. A 25 gram sample of eiderdown fabric was impregnated at 80° C. for 15 minutes in the above solution. The fabric was then wrung out and pressed with a hot iron until dry. The results of moth tests thereon are given in Table I.

C. This process was the same as B except that for making the deacetylated chitin fluosilicate only one-half the amount of fluosilicic acid solution was used, i. e., 1.16 grams of fluosilicic acid in 50 cc. of water. The treated sample was subjected to moth tests, the results of which are recorded in Table I.

EXAMPLE V

Process for mothproofing with the fluosilicate of piperidylmethylzein

A. A solution of the fluosilicate of piperidylmethylzein was prepared by dissolving 0.79 part of piperidylmethylzein in 99.21 parts of an aqueous solution containing 0.42 part of $H_2SiF_6$. The anhydrous salt may be isolated from this solution by evaporation of the water or by the method of Example II, but it is preferable to use this solution directly for mothproofing. In carrying out this latter process one part by weight of eiderdown cloth was soaked in 20 parts of the above solution at a temperature of 80° C. for 4 minutes. The excess solution was then removed by wringing and the sample of fabric was pressed with a hot iron until dry. The results of moth tests thereon are given in Table I.

B. Procedure A was repeated, the mothproofing solution being made by dissolving 0.1 part of piperidylmethylzein in 99.9 parts of an aqueous solution containing 0.42 part of $H_2SiF_6$. This sample was also resistant to moths as shown in Table I.

EXAMPLE VI

Process for mothproofing with the fluosilicate of methylamine-phenol-formaldehyde resin A. To make a solution of the normal fluosilicate 0.87 part of methylamine-phenol-formaldehyde resin was dissolved in 99.13 parts of an aqueous solution containing 0.42 part $H_2SiF_6$. The anhydrous normal fluosilicate of methylamine-phenol-formaldehyde resin may be isolated from this solution by evaporation of the water or by the method of Example III, but it is preferred to use the solution directly for mothproofing. One part of eiderdown fabric was impregnated in 20 to 30 parts of this solution at a temperature of 70° C. for 4 minutes. The excess solution was removed by wringing, and the sample was dried and heat-treated by pressing with a hot iron. It was resistant to action of insects as demonstrated in Table I.

B. The above process was repeated with a solution containing the acid fluosilicate of the amino resin. This was prepared by dissolving 0.22 part of methylamine phenol-formaldehyde resin in 99.78 parts of an aqueous solution containing 0.42 per cent $H_2SiF_6$. The treated sample was also resistant to moths as is disclosed in Table I.

C. The above process was repeated using a mothproofing solution containing 0.11 part of the amino resin dissolved in 99.89 parts of an aqueous solution containing 0.42 per cent fluosilicic acid. Even with this small amount of amino polymer fluosilicate thereon, the fabric is resistant to moths as is shown in Table I.

Example VII

*Process for mothproofing with the fluosilicate of dimethylamine-phenol-formaldehyde resin*

A solution of the acid fluosilicate of dimethylamine-phenol-formaldehyde resin was prepared by dissolving 5 parts of the amino resin (the product disclosed in Bruson U. S. 2,031,557) in 15.7 parts of 15.4 per cent aqueous fluosilicic acid solution. The acid fluosilicate may be isolated by evaporation of the water or by precipitation with methanol, but it is preferred to use this solution for mothproofing by diluting it with 583.6 parts of water and 150 parts of acetone to make a solution containing 1 per cent of the fluosilicate. One part by weight of woolen cloth was soaked in 20 to 30 parts of the above solution at 50° C. for 4 minutes, wrung out, and dried and heat treated by pressing with a hot iron. The treated cloth was unchanged in appearance and was essentially unattacked by moth larvae both before and after washing with soap and water.

Example VIII

*Process for mothproofing with the acid fluosilicate of methylglucamine-phenol-formaldehyde resin*

Methylglucamine-phenol-formaldehyde resin was prepared by adding a mixture of 21 parts of methylglucamine, 10 parts of formalin and 9 parts of water to a mixture of 14 parts of phenol and 14 parts of formalin. This mixture was then heated for 2½ hours at 90° C. with good stirring. The water-insoluble amino resin thus formed was used in the preparation of the acid fluosilicate. A 40 per cent solution of the latter material was made by mixing 30 parts of methylglucamine-phenol-formaldehyde resin, 62 parts of 29.8 per cent fluosilicic acid solution and 30 parts of water. The anhydrous fluosilicate may be obtained from the solution by evaporation of the water or by the methods of Examples I, II, and III. However, it is preferable to use the above solution for mothproofing after first diluting one part with 39 parts of water. One part of woolen cloth was impregnated in 20 parts of the dilute solution (containing 1 per cent of the acid fluosilicate of methylglucamine-phenolformaldehyde resin) at 80° C. for 4 minutes, after which the excess solution was removed by wringing and the cloth dried and pressed with a hot iron. The cloth thus treated was immune to attack by moth larvae even after it had been washed continuously for 40 minutes with soap and water.

Example IX

*Process for mothproofing with the fluosilicate of beta-dimethylaminoethyl methacrylate*

A 1 per cent solution of the acid fluosilicate of beta-dimethylaminoethyl methacrylate polymer was prepared by dissolving 15.7 parts of the methacrylate polymer (prepared according to Harmon U. S. application Ser. No. 21,810, filed May 16, 1935) in a solution comprising 14.4 parts of $H_2SiF_6$ in 2,980 parts of water. One part of woolen cloth was soaked in 25 parts of this solution for 4 minutes at 80° C., wrung out and pressed with a hot iron until dry. The fabric was resistant to moth attack even after washing for a continuous period of 40 minutes with soap and water.

Example X

*Process for mothproofing with the fluosilicate of beta-diethylaminoethyl methacrylate polymer*

A 1 per cent solution of the acid fluosilicate of beta-diethylaminoethyl methacrylate was prepared by dissolving 5 parts of the polymer (made according to Harmon U. S. application Ser. No. 21,810, filed May 16, 1935) in a solution comprising 3.89 parts of $H_2SiF_6$ and 880 parts of water. A sample of woolen cloth treated therewith according to the procedure of Example IX was rendered resistant to moth attach both before and after laundering with soap and water.

Example XI

*Process for mothproofing with the fluosilicate of polymeric 1-(beta-methacrylyloxyethyl)piperidine*

A 1 per cent solution of the acid fluosilicate of polymeric 1-(beta-methacrylyloxyethyl)piperidine was prepared by dissolving 4.6 parts of the polymer (prepared according to Harmon copending application Ser. No. 21,810, filed May 16, 1935) in a solution of 3.37 parts of $H_2SiF_6$ in 789 parts of water. Samples of woolen cloth treated with this solution after the manner described in Example IX suffered essentially no damage by moth attack even after being subjected to a period of continuous washing for 40 minutes with warm soapy water.

Moth Tests

The moth tests, representative results of which are given in Table I, were carried out by confining twelve vigorous larvae of the webbing clothes moth in a cardboard pill box with a 1¼ inch disk of the treated eiderdown fabric. The larvae were reared on the same type of fabric, for which the insects showed a particular liking, and only vigorous larvae of an age of three to four weeks were used so that during the course of the tests practically none of them reached the non-feeding pupa stage. As the concentration of larvae per square inch of fabric was about ten times that observed in naturally occurring heavy infestations, these tests were extremely rigorous. Observations were made at weekly intervals for three weeks, and the number of larvae that had died or pupated was recorded. Due to the selection of the larvae at the correct stage in their development, in no case were all larvae dead at the end of the third week, and only occasionally was pupation observed. Referring to Table I, the damage is indicated by the estimated per cent of the total surface, the nap of which was even slightly fed upon. The laundered samples were washed in an electric washing machine continuously for 40 minutes at 40° C. in "Lux" soap suds. The samples were dry cleaned by agitating in "Tri-clene" for 10 minutes, followed by rinsing in naphtha.

Table I

| Samples treated according to examples | Damage after 3 weeks | | |
|---|---|---|---|
| | Unlaundered | Laundered | Drycleaned |
| | Percent | Percent | Percent |
| IV A | 0 | 1 | |
| IV B | 0 | 1 | |
| IV C | 0 | 5 | |
| V A | 8 | 5 | 15 |
| V B | 10 | 20 | 2 |
| VI A | 10 | 3 | 3 |
| VI B | 1 | 3 | 15 |
| VI C | 3 | 3 | 8 |
| Treated with 0.42 percent fluosilicic acid alone | 2 | 55 | |
| Treated with saturated sodium aluminum fluosilicate solution | 15 | | |
| Untreated control | 90 | | |

While I prefer to carry out the mothproofing process with these materials by impregnating the material to be mothproofed in an aqueous solution of the fluosilicates at 75 to 85° C. for about 4 minutes, the process may be carried out over different periods of time and at temperatures of from 20° C. to 100° C. For example, I have found it desirable in some cases to carry out the impregnation at the boil for a period of one hour. Also the process may be carried out as a batch operation or as a continuous process in which the fabric is passed through a bath containing the aqueous fluosilicate and then through padding rolls, after which the cloth may be dried and heat-treated by hot calendering or in a drying cabinet maintained at a temperature of about 100° C. As is illustrated in some of the examples, the fluosilicate of the amino-nitrogen-containing polymer may be formed in situ in the fibers by treating the material first with a solution of the amino-nitrogen containing polymer, followed by impregnation with fluosilicic acid as in Example IV-A, or the sequence of treatments may be reversed. Either of these processes is especially suitable for the application of insoluble amino-polymer fluosilicates, such as the fluosilicate of deacetylated chitin. Also the fiber may be impregnated with the fluosilicate of a polymerizable amino-nitrogen-containing monomer which may be subsequently polymerized completely in situ, this procedure being particularly useful with the fluosilicates of amino alcohol esters of methacrylic acid. Various solvents other than water may be used, this depending upon the particular amino polymer; for example, dimethylamine-phenol-formaldehyde resin acid fluosilicate requires for solubility a mixture of at least 20 parts acetone to 80 parts of water. Polymeric amino fluosilicates completely soluble in organic solvents can be used to advantage.

The present mothproofing processes may be carried out in connection with various textile finishing operations such as scrubbing, dyeing, sponging, dry-cleaning and the like, and on yarn, cloth or completely fabricated articles. Also, the polymeric amino fluosilicate mothproofing agents may be used in combination with other parasiticides, fungicides, bactericides, pigments, dyes, penetrating agents, soaps, sizes, wetting agents, textile finishing agents, etc.

There may also be used in this invention and the invention is generic to salts of the hereinbefore described polymeric amino bodies that contain fluorine-containing anions other than the fluosilicate radical, such as the fluorides, particularly fluoro anions containing positive elements, e. g., the fluoroborates, the fluoaluminates, the fluotitanates, and the like.

I may use in the present invention, fluoro salts particularly salts with binary fluoro anions preferably the fluosilicates of numerous aminonitrogen-containing polymers other than those mentioned in the examples. For example, I may employ generally the acid-soluble amino proteins, which are the reaction products of proteins such as casein, zein, and the like with lower aliphatic aldehydes or ketones and amines having less than nine carbon atoms in which the amino-nitrogen is joined to an aliphatic carbon, for example, those disclosed in Meigs copending application, Serial No. 59,643, filed January 17, 1936. There may also be employed in this invention amino-celluloses, soluble in dilute aqueous acetic acid, containing an amino-nitrogen removed from the cellulose nucleus by a chain of atoms comprising at least one carbon atom, for example, those described in Hardy copending application, Serial No. 61,842, filed January 31, 1936; cellulose amines which are soluble in at least the stoichiometrical amount of dilute aqueous acetic acid and containing directly attached to the cellulosic nucleus from 0.5 to 1.5 amino nitrogens per glucose unit, for example, those described in Haskins copending application Serial No. 61,806, filed January 31, 1936; reaction products of vinyl ketone polymers with ammonia or primary amines, for example, those described in Balthis copending application Serial No. 69,725, filed March 19, 1936; the products obtained by catalytically hydrogenating resins having ketone groups at superatmospheric temperature and pressure and in the presence of ammonia or primary or secondary amines, such as those described in Greenewalt copending application, Serial No. 69,723, filed March 19, 1936; and other polymeric amino alcohol esters of alpha-substituted acrylic acids, for example, those described in Harmon copending application Serial No. 21,810, filed May 16, 1935, and in Graves copending application Serial No. 21,807, filed May 16, 1935. There may also be employed in the invention the dilute acetic acid-soluble aminonitrogen-containing resins prepared by reacting a phenol containing carbon, hydrogen, and oxygen only, and having at least two unsubstituted nuclear positions ortho or para to phenolic hydroxyl, with an aldehyde (particularly formaldehyde) and a non-aromatic amine containing less than 7 carbon atoms, the molecular ratio of amine to phenol being not less than 0.5:1 and not greater than 1:1, and the molecular ratio of aldehyde to amine being greater than 1:1. Certain of the resins within this class are disclosed in Harmon & Meigs copending application Serial No. 85,820, filed June 17, 1936. Still other polymeric amino-nitrogen-containing resins soluble in dilute acetic acid and suitable for use in this invention include the resinous products prepared by treating polyvinylchloroacetate with secondary aliphatic amines; resins prepared by reacting aliphatic or alicyclic ketones with formaldehyde and primary or secondary aliphatic amines; resinous products resulting from the reaction of diphenyl- or other diarylguanidine, formaldehyde, and primary or secondary amines; reaction products of epichlorohydrin with primary aliphatic amines, which reaction products have been polymerized in the presence of catalytic proportions of stannic chloride; the reaction product of phenol-lignin with dimethylamine and formaldehyde; and the reaction products of triethanolamine with phthalic esters, singly or in combination.

Additional examples of specific polymeric amino-nitrogen containing substances which function in this invention are dimethylaminopropyl cellulose; beta-aminoethoxyethyl cellulose; beta-dibutylaminoethyl cellulose; the mixed amino-propyl-aminopropoxyethyl ether of cellulose; dibutylaminopropyl cellulose; the mixed methyl-dimethylaminopropyl ether of cellulose; amylaminomethyl cellulose; diethylamino glycol cellulose; hydroxyethylamino glycol cellulose; benzylamino methyl cellulose; diethylamino methyl cellulose; 2-hydroxycyclohexylaminomethyl cellulose; amylamino cellulose; beta-dicyclohexylaminoethyl methacrylate polymer; beta-di-n-butylaminoethyl methacrylate polymer; 2-aminocyclohexyl methacrylate polymer; triethanolamine monomethacrylate polymer; 2-(diethylamino)cyclohexyl methacrylate polymer; 4-(beta-methacrylyloxyethyl)morpholine polymer; beta-diethylaminoethyl acrylate polymer; beta-dicyclohexylaminoethyl acrylate polymer; the resin obtained by the hydrogenation, in the presence of ammonia, of polymerized bis(4-ketocyclohexyl)dimethylmethane; the resin obtained from the hydrogenation, in the presence of ammonia, of polymerized methylvinyl ketone; the reaction product of polymeric methyl-α-methylvinyl ketone and aqueous ammonia; the reaction products of polymeric methylvinyl ketone with aqueous ammonia (or cyclohexylamine, glucamine, ethanolamine, or ethylene-diamine); dimethylaminomethylzein; diethylaminomethylzein; dibutylaminomethylzein; cyclohexylethylaminomethylzein; piperazylmethylzein; piperidylmethylglycinin; dimethylaminomethylgliadin; dimethylaminoethylcasein; monoethylaminomethylzein; the reaction product of polyvinyl chloroacetate and dibutylamine; the resin obtained by reacting cyclohexanone and formaldehyde with methylamine; the products obtained by reacting acetone and paraformaldehyde with methyl or butylamine; and the resin obtained by reacting diphenylguanidine and formaldehyde with methylamine. These are examples of the broad class which I have found to be of generic operativeness, namely, the fluoro salts and particularly the fluosilicates, acid and normal, of polymeric amino-nitrogen-containing substances, which polymers are substantially insoluble in water and 5% aqueous ammonia but soluble in 2% aqueous acetic acid, and are preferably capable of being converted to a coherent film.

The present amino polymer fluosilicate mothproofing compositions are of outstanding advantage. By virtue of the amino polymer portion of the molecule, they may be insolubilized on the material to be mothproofed. The material is thus rendered immune to the ravages of textile pests such as the case-making clothes moth (*Tinea pellionella*), the webbing clothes moth (*Tincola bisellella*), the tapestry moth (*Trichophaga tapetzella*), the common carpet beetle (*Anthrenus scrophulariae*), the black carpet beetle (*Anthrenus verbosci*), the furniture carpet beetle (*Anthrenus fasciatus*), crickets and other insects which prey on textile materials, furs, bristles, leather goods, hair goods, raw wool, mohair, and the like. This immunization is greatly resistant to washing and dry cleaning yet the material is essentially unchanged in strength, color, feel and is also nontoxic to humans.

While the present compositions are of particular use against moths, they are toxic toward lower forms of life generally and may be used to destroy or control such.

The above description and examples are intended to be illustrative only. Any modification of or variation therefrom which conforms to the spirit of the invention is intended to be included within the scope of the claims.

I claim:

1. A salt of an inorganic acid having a fluorine-containing anion with a polymeric amino-nitrogen-containing substance, which polymer is insoluble in water and in 5 per cent aqueous ammonia but soluble in 2 per cent aqueous acetic acid, and is capable of being formed into a coherent film.

2. A salt of an inorganic acid having a fluorine-containing binary anion with a polymeric amino-nitrogen-containing substance, which polymer is insoluble in water and in 5 per cent aqueous ammonia but soluble in 2 per cent aqueous acetic acid, and is capable of being formed into a coherent film.

3. A fluosilicate of a polymeric amino-nitrogen-containing substance, which polymer is insoluble in water and in 5 per cent aqueous ammonia but soluble in 2 per cent aqueous acetic acid, and is capable of being formed into a coherent film.

4. An aqueous solution of a fluosilicate of a polymeric amino-nitrogen-containing substance, which polymer is insoluble in water and in 5 per cent aqueous ammonia but soluble in 2 per cent aqueous acetic acid, and is capable of being formed into a coherent film.

5. An insecticidal composition, particularly suited for mothproofing, which comprises an aqueous solution of a fluosilicate of a polymeric amino-nitrogen-containing substance, which polymer is insoluble in water and in 5 per cent aqueous ammonia but soluble in 2 per cent aqueous acetic acid, and is capable of being formed into a coherent film.

6. Process of preparing salts toxic to lower forms of life which comprises reacting fluosilicic acid with a polymeric amino-nitrogen-containing substance, which polymer is insoluble in water and in 5 per cent aqueous ammonia but soluble in 2 per cent aqueous acetic acid, and is capable of being formed into a coherent film.

7. Fabrics otherwise subject to the ravages of insects such as moths but protected therefrom by impregnation with a fluosilicate of a polymeric amino-nitrogen-containing substance, which polymer is insoluble in water and in 5 per cent aqueous ammonia but soluble in 2 per cent aqueous acetic acid, and is capable of being formed into a coherent film.

8. A mothproofing composition containing as its active ingredient an addition salt of a polymeric amino-nitrogen-containing substance, which polymer is insoluble in water and in 5 per cent aqueous ammonia but soluble in 2 per cent aqueous acetic acid, and is capable of being formed into a coherent film, and an inorganic acid whose anion is binary and contains fluorine.

9. Process of preparing mothproofing compositions which comprises bringing a solution of fluosilicic acid in contact with a polymeric amino-nitrogen-containing substance insoluble in water and in 5% aqueous ammonia but soluble in 2% aqueous acetic acid and capable of being formed into a coherent film.

10. Process of preparing mothproofing compositions which comprises bringing aqueous fluosilicic acid in contact with a polymeric amino-nitrogen-containing substance, which polymer is insoluble in water and in 5 per cent aqueous ammonia but soluble in 2 per cent aqueous acetic acid, and is capable of being formed into a coherent film.

11. Process of protecting fabrics from the ravages of insects, such as moths, which comprises impregnating said fabric with a solution of a fluosilicate of a polymeric amino-nitrogen-containing substance, which polymer is insoluble in water and in 5 per cent aqueous ammonia but soluble in 2 per cent aqueous acetic acid, and is capable of being formed into a coherent film, and heating the impregnated fabric at a temperature of at least 100° C., until dry, to insolubilize the fluosilicate.

12. Process of protecting fabrics from the ravages of insects, such as moths, which comprises forming on and in the fabric a fluosilicate of a polymeric amino-nitrogen-containing substance, which polymer is insoluble in water and in 5 per cent aqueous ammonia but soluble in 2 per cent aqueous acetic acid, and is capable of being formed into a coherent film, and heating the fabric at a temperature of at least 100° C., until dry, to insolubilize the fluosilicate.

13. A fluosilicate of polymeric beta-dimethylaminoethyl methacrylate.

14. An insecticidal composition, particularly suitable for mothproofing, which comprises an aqueous solution of a fluosilicate of polymeric beta-dimethylaminoethyl methacrylate.

15. A fluosilicate of deacetylated chitin.

16. An insecticidal composition, particularly suitable for mothproofing, which comprises an aqueous solution of a fluosilicate of deacetylated chitin.

17. A fluosilicate of methylamine-phenol-formaldehyde resin.

18. An insecticidal composition, particularly suitable for mothproofing, which comprises an aqueous solution of a fluosilicate of methylamine-phenol-formaldehyde resin.

PAUL L. SALZBERG.